United States Patent
Heelan et al.

(10) Patent No.: US 7,337,146 B2
(45) Date of Patent: Feb. 26, 2008

(54) EMERGENCY INFORMATION MANAGEMENT SYSTEM

(75) Inventors: Jake Heelan, Portland, OR (US); Charles Jennings, Portland, OR (US); Pete O'Dell, Portland, OR (US); Ryan McMahon, Portland, OR (US); Grant Roholt, Portland, OR (US)

(73) Assignee: Swan Island Networks, Inc., Portland, OR (US)

( * ) Notice: Subject to any disclaimer, the term of this patent is extended or adjusted under 35 U.S.C. 154(b) by 592 days.

(21) Appl. No.: 10/382,125

(22) Filed: Mar. 4, 2003

(65) Prior Publication Data

US 2004/0006694 A1    Jan. 8, 2004

Related U.S. Application Data

(60) Provisional application No. 60/361,647, filed on Mar. 4, 2002.

(51) Int. Cl.
*H04K 1/00* (2006.01)
*H04L 9/00* (2006.01)

(52) U.S. Cl. .......................... 705/52; 705/51; 705/53; 705/54; 705/55; 705/56; 705/57; 705/58; 340/506; 340/531; 340/539.17; 379/49; 380/227; 380/228; 380/229; 380/230; 709/220; 709/224; 713/168; 713/201

(58) Field of Classification Search ............ 705/50–59; 340/506, 531–9; 379/49; 380/227–30; 709/220, 709/224; 713/168, 201
See application file for complete search history.

(56) References Cited

U.S. PATENT DOCUMENTS

| | | | |
|---|---|---|---|
| 5,636,245 A | 6/1997 | Ernst et al. ................. | 375/259 |
| 6,084,510 A | 7/2000 | Lemelson et al. .......... | 340/539 |
| 6,169,805 B1 | 1/2001 | Dunn et al. ................. | 380/277 |
| 6,247,059 B1 | 6/2001 | Johnson et al. ............ | 709/237 |
| 2003/0069002 A1* | 4/2003 | Hunter et al. .............. | 455/404 |
| 2003/0078934 A1* | 4/2003 | Cappellucci et al. ....... | 707/101 |
| 2003/0141971 A1* | 7/2003 | Heiken, Jr. ................. | 340/506 |
| 2003/0217151 A1* | 11/2003 | Roese et al. ............... | 709/225 |
| 2004/0133793 A1* | 7/2004 | Ginter et al. ............... | 713/193 |

OTHER PUBLICATIONS

PCT International Search Report dated Sep. 11, 2003 for International Application No. PCT/US03/06526.

* cited by examiner

*Primary Examiner*—Bradley Bayat
(74) *Attorney, Agent, or Firm*—Stoel Rives LLP

(57) ABSTRACT

A wide-area emergency information management system includes a broadcasting entity (10) and delivers content to authorized receiver clients (20), such as PC's, laptops, wireless devices, etc. The specific content (26), which can include voice, text, video or any other information content related to a planned response to a given crisis or emergency such as enemy attack or natural disaster, is prepared in advance (28), tailored to the class of recipient receiver client and/or user (44), securely downloaded (32,36) and stored locally in a secure cache (21). In response to a small control file from a centralized emergency management authority, the receiver client system accesses the cache (21), decrypts the content (26), and delivers it to the end user.

28 Claims, 4 Drawing Sheets

EMERGENCY INFORMATION MANAGEMENT SYSTEM

RELATED APPLICATIONS

This application claims priority from U.S. Provisional Application No. 60/361,647 filed Mar. 4, 2002.

COPYRIGHT NOTICE

© 2002-2003 Swan Island Networks, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present invention pertains to emergency management and, more specifically, relates to secure, timely management of information dissemination during a crisis or disaster.

BACKGROUND OF THE INVENTION

Many technologies are in place for communicating information. Information can be broadcast to a wide audience via existing television and radio stations, for example. An "emergency broadcast system" that employs existing television and radio infrastructure has been known for a long time. While this approach can be used to widely disseminate a generic message, for example a text message read by a live announcer, it is not easily customized for different recipients, and there is no "feedback" to indicate who actually received the message. Furthermore, all such broadcasts are public by design, so they cannot be used for controlled or secure communications.

Digital communications, for example via email or the Internet, have several advantages. First, they can be made relatively private, for example using known encryption technologies, and/or login and password procedures, but all of these require some pre-arrangements at the receiving end, for example establishing a "user account". Such arrangements are not practical for widespread use when time is of the essence, as during a crisis or emergency such as a flood or military attack.

Digital communications also provide, in many cases, a convenient way to implement feedback or "closed loop" communications to ensure delivery. For example, modern email and network software ensure email delivery (or provide an error message to the sender). Email, however, requires that every recipient have an individual email user account, and that the user access that account to receive email. An urgent emergency message would be of no practical use if the intended recipient (or thousands of them) did not happen to check their email for new messages at the critical time.

For these and other reasons explained below, the need exists for improvements in the management of emergency information to ensure timely delivery of appropriate content to intended recipients, especially during an emergency when some channels of communication may be disrupted or overwhelmed by an extraordinary volume of message traffic. Also, it may also be beneficial to securely "pre-position" content in advance of a crisis or event, providing near-instantaneous availability from a local source.

SUMMARY OF THE INVENTION

The invention is directed to management of information, in anticipation of and during times of disaster or crisis. In one aspect, it can be described as a secure, wide-area emergency information management system that utilizes a broad range of existing technologies, standards and protocols to provide a survivable method of information distribution with an auditable receive/read trail during times of disaster or crisis. The system is designed to run on a variety of computer platforms. In a presently preferred embodiment, the inventive system delivers encrypted "content" such as video, audio, graphic and text content over a wide range of public and private networks, including but not limited to the Internet, the Public Switched Telephone Network, wireless telecommunications networks, Cable, DSL, Optical Fiber and Satellite.

The inventive system delivers such content to a variety of client-receiver devices including but not limited to desktop computers, laptop computers, hand-held and palm-top computer devices, cellular telephones, pagers and anticipated permutations and combinations of these existing device technologies. This information/data flows to these devices through a secure channel in anticipation of an emergency event and is stored on the local client in an encrypted or otherwise obfuscated cache. The cache content, or only selected portions of it, are made available to fully authorized, authenticated and classified users in times of emergency, according to the type of event and the role of the user, both while connected to a central system and on a stand-alone basis. The system also provides for real-time and near real-time streaming and live chat and local situation reporting.

Accordingly, one aspect of the invention can be described as a wide-area emergency information management system comprising the following elements:

(a) a content authoring module for preparation of digital content for delivery in response to a predetermined class of incident to a selected recipients;

(b) a security/authentication module for authenticating the digital content received from the content authoring module for distribution and for authenticating the selected recipients;

(c) a policy management system coupled to the content authoring module and to the security/authentication module for managing content distribution; and (d) a broadcast module for securely distributing said digital content only to authenticated selected recipients authorized to receive the digital content.

In one embodiment, the system can further include a logging and reporting module for maintaining records that indicate what digital content files where accessed, when and by whom.

The system is designed for communication with a "receiver client," by which we mean a combination of hardware and/or and software suitable for receiving emergency information as described herein. A receiver client is capable of communicating with the broadcast module to receive the digital content, and the receiver client preferably implements means for securely caching the digital content received from the broadcast module; means for decrypting the digital content and delivering it to an authorized user of the receiver application when authorized to do so; and means for reporting user activity back to the logging/ reporting facility to confirm delivery and subsequent usage of the authenticated digital content to the selected recipients.

The policy management system in one illustrative embodiment maintains a user matrix for selecting and authorizing recipients of particular digital content based on predetermined criteria comprising one or more of a recipient's identity, grade, level, agency and location.

The policy management system can also maintain a content matrix for selecting and authorizing distribution of content based on predetermined criteria. For example, such criteria can be one or more of a DRM rule, content priority, user priority, and an alert status of the emergency information management system.

Additional aspects and advantages of this invention will be apparent from the following detailed description of preferred embodiments, which proceeds with reference to the accompanying drawings.

DETAILED DESCRIPTION OF PREFERRED EMBODIMENTS

General Overview

Content is prepared and submitted for distribution throughout the system by certified Publishing entities or their authorized agents or proxies. This material is prepared for user distribution in the Policy Management Module through the consideration of Rights Management, Content Priority, User Priority, Alert Status and the User Matrix (Grade, Level, Agency and Location). The content is packaged and encrypted appropriate to the type of content (Video, Audio, Graphics or Text). This material is then handled by the Mechanical Preparation Module for Quality Assurance issues, encoded and tagged with metadata suitable to the type of end receiver device (PC, Hand-held computer, Cellular Phone or Pager) and is then forwarded to the Broadcast/Streaming Content Servers.

The Server Side

Figure 1:
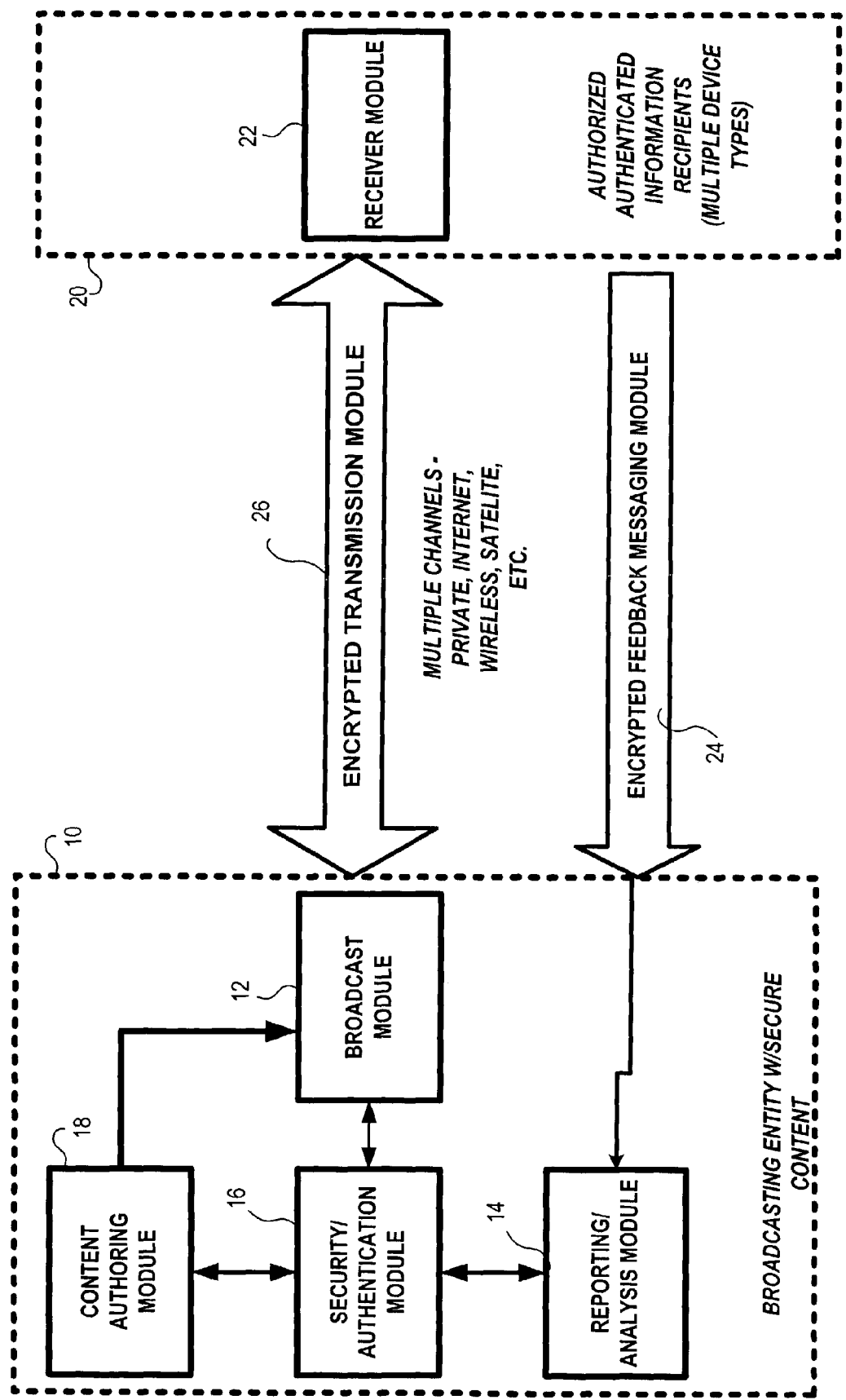
FIG. 1 is a simplified, top-level block diagram of a secure emergency information management network in accordance with the present invention.

Referring now to FIG. 1, a simplified architectural diagram of the emergency information management network comprises a server side 10 and an illustrative client side 20. Of course, the server side can include multiple servers (not shown), deployed at one location or, preferably, at multiple locations to improve reliability in the event of a power failure or the like at any given location. A distributed network could be used, preferably with appropriate redundancies.

At the server side, a content authoring module 18 is used to import and/or create content to be delivered to users, as further explained later, in the event of an incident. The term "incident" is used broadly herein and in the appended claims to refer to almost any situation, crisis or emergency in which prompt yet carefully controlled distribution of information and user action would be helpful. Examples of incidents include a physical attack (via conventional explosive, chemical, biological, nuclear or other weapons, especially weapons of mass destruction); natural disasters such as flooding, hurricanes, etc.; wild fires; etc. The system can also be used to distribute ("pre-position") rich, e.g., multi-media data to be "delivered", i.e., displayed substantially simultaneously to intended recipients at a subsequent, scheduled time, such as an on-line meeting, new product rollout, etc.

The present invention provides for carefully controlled delivery of content to specific client devices and/or individual users, so distinct content packages or files can be created as appropriate. As one example, a message for distribution to the general public in the case of a nuclear attack may be different from the content to be delivered to government, law enforcement or military personnel in the same scenario.

Referring again to FIG. 1, the server side further includes a security/authentication module 16 which can be used to "secure" the content to be distributed, for example using encryption or other means of obfuscation. Security can be imposed using various known means to control the client receiver devices that are authorized to receive particular content. Further, the security module can enforce authentication of persons authorized to submit or modify content, or specify the "rules" for its distribution. A distribution rule can specify, for example, classes of client machines or individual persons authorized to receive particular content.

After appropriate provisions are made for security and authentication by module 16, the corresponding content from module 18 is provided to a broadcast or distribution module 12. Note that the broadcast module is part of the secure broadcast server facility 10 to ensure that distribution "rules" are enforced. It possible to envision a network of broadcast modules distributed across disparate locations and controlling their interaction with the server facility via secure network protocols, such as SSL (Secure Sockets Layer), VPN (Virtual Private Networking), etc.

Content Stored on these servers is sent in the background, typically upon request from the Client 20, to be stored in a local encrypted and obfuscated cache at the client side 20. The term "background" here means that the request to download content may be sent without user interaction or input, at scheduled times, periodically, or whenever a suitable connection is available. In other words, it happens automatically even though the user may be absent or doing other things. In response to such a request, the broadcast module 12, in cooperation with the security/authentication module 16, ensures that the requesting client is authorized, determines what content is intended for that client, and then downloads the (encrypted) content via a secure transmission module 26. All this is typically done in advance of an incident that would require delivery of the content, but may also occur in real-time as events unfold.

In this application, "broadcasting" or "distribution" of content refers to transmitting the content from a server to a receiving client device. This step is also sometimes called "pre-positioning" the content. Regardless, at that juncture, the content remains secure and is not made available to any user for viewing. Rather, it is stored locally in a secure cache for "delivery" to the end user only if and when needed as taught herein.

Prepared content can be sent securely ("distributed") over various transport paths, for example—Internet, PSTN, Wireless, Satellite and by removable media (i.e. diskettes or CDROM). Almost any device capable of receiving and storing transmitted data can be configured to serve as a receiver client for present purposes. Digital communication is preferred although analog or mixed technologies such as VOIP or in-band wireless signaling can be used.

The server side 10 also can include reporting/analysis module 14. This module receives (preferably encrypted or otherwise secure) feedback messages and/or data from receiver clients 20 via a feedback messaging module 24. Such feedback can include reports of various activity at the client side. For example, the feedback might indicate that the local cache is full or has been compromised. Another feedback message might indicate that a control file was successfully received; and it might further indicate what content was accessed and delivered. In a presently preferred embodiment, the feedback message would further indicate when and to whom the content was delivered. The reporting/analysis module can use this information to determine the results of actions taken in response to an incident.

Figure 2:
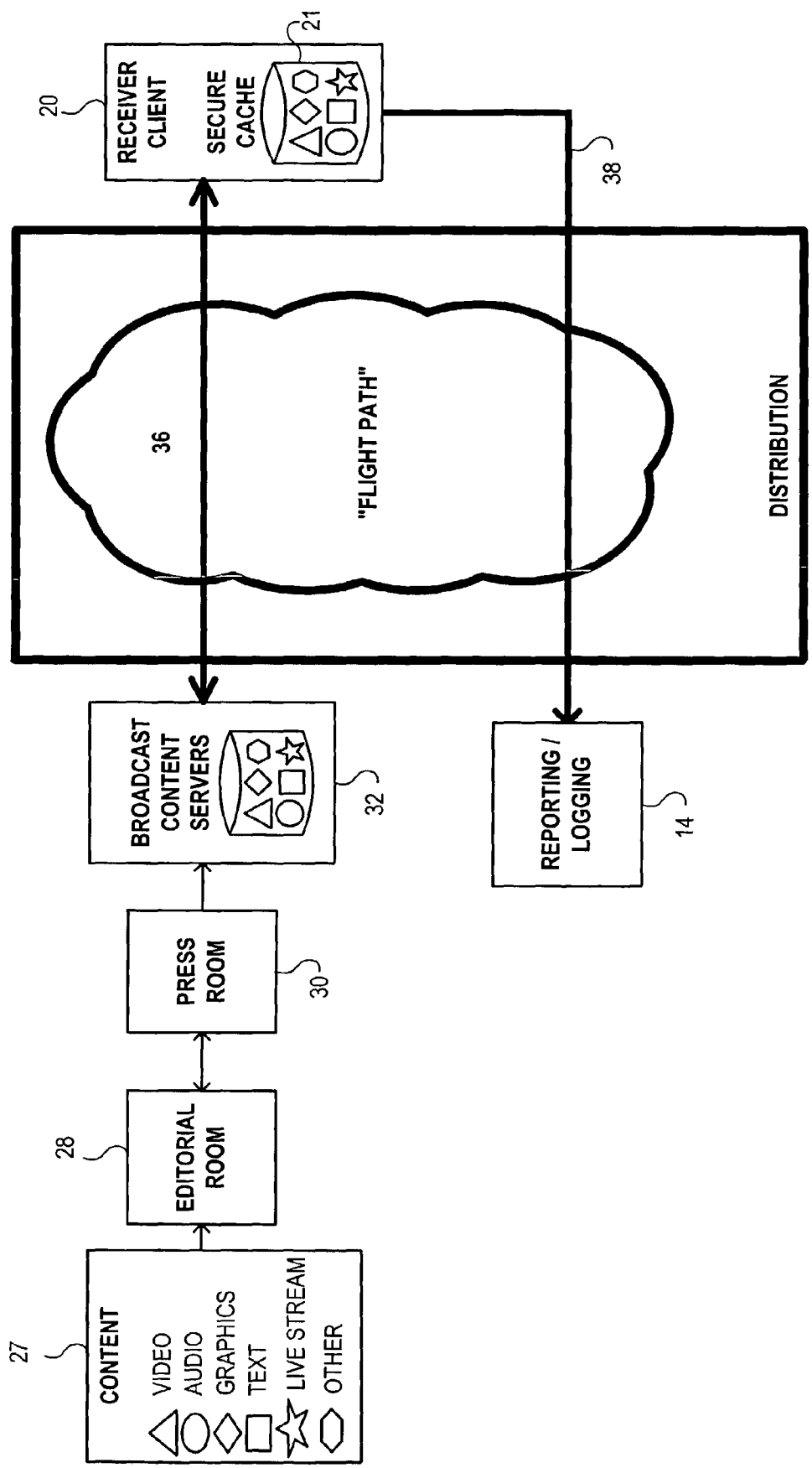
FIG. 2 is a block diagram illustrating a secure emergency information management network in accordance with the present invention with selected server-side components shown in greater detail.

Referring now to FIG. 2, this drawing further illustrates the inventive concept. The receiver client 20 includes a secure cache 21 as mentioned above. The "flight path" 36 refers to various potential distribution systems. These can range from physical media (pick up an emergency CD at the grocery store or receive one in the "mail), to cable, Internet, telecom, wireless etc. Preferably, multiple communications channels are enabled to improve reliability and availability. Importantly, the channel used for distribution of digital content (26 in FIG. 1) need not be the same channel as that used to send a short emergency message or "control file" in connection with an incident. Because the control file is small, any available channel will work, even one providing very low bandwidth, such as a dialup modem over an ordinary POTS line. Email can be used. The flight path 36 also illustrates a return or feedback path 38 for communications from the client to the server side for reporting and logging purposes.

On the server side, FIG. 2 illustrates a collection of content 27, for example video, audio, graphics, text, live stream, etc. used in building suitable content for emergency use. The content for ultimate distribution is assembled in the "editorial room" 28 by authorized (and qualified) personnel or their proxies. The completed content is provided to the "press room" 30 for processing further described below. Finally, the output is provided to one or more broadcast servers 32 functionally similar to the entity 10 described with reference to FIG. 1 above.

Figure 3:
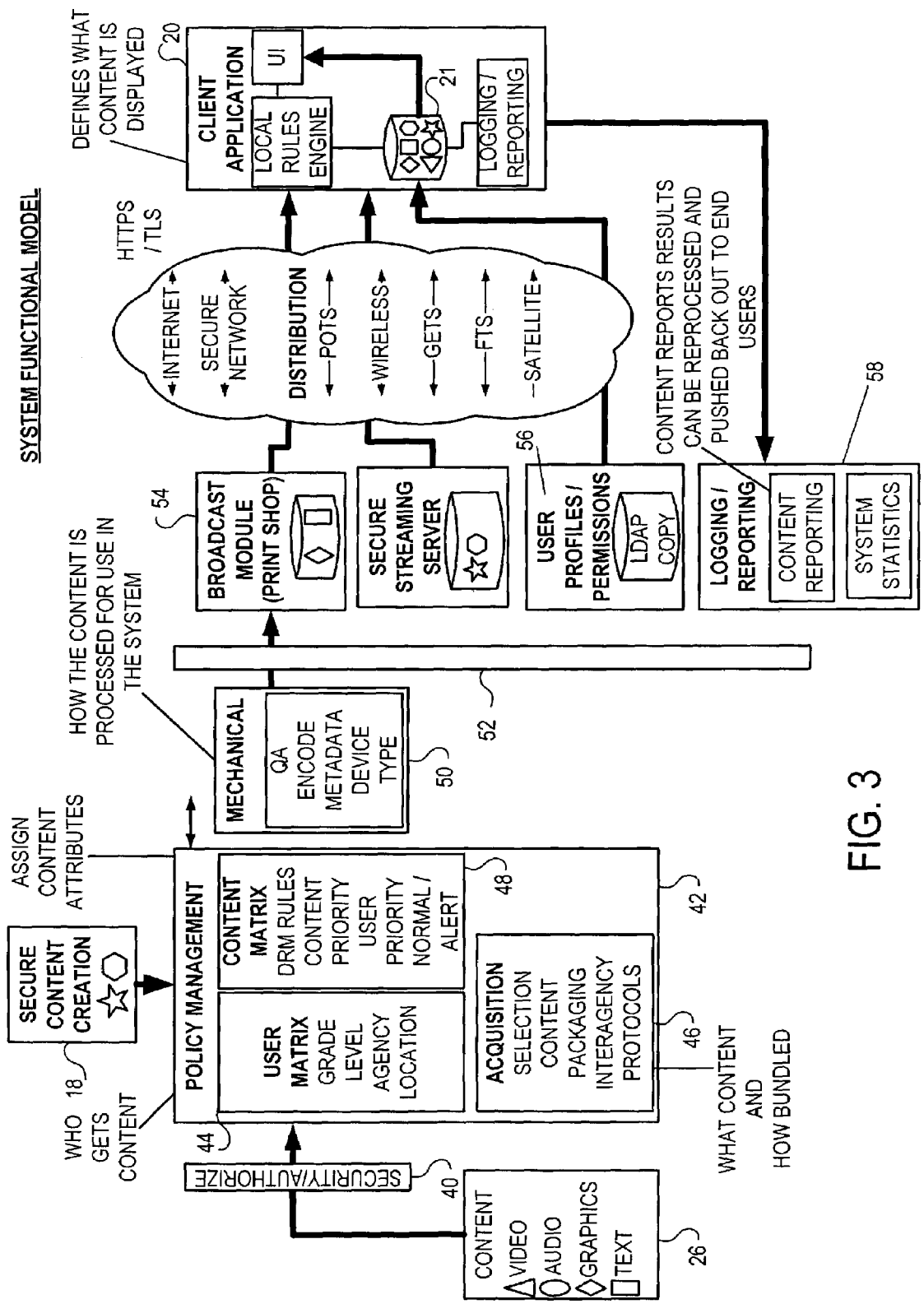
FIG. 3 is an illustrative functional model of a secure emergency information management system in accordance with the present invention.

FIG. 3 is a system functional model, some aspects of which have already been described. In FIG. 3, on the server (left) side, a policy management system 42 is coupled to the content authoring module 18 (see FIG. 1) and to the security/authentication module 40 for managing content distribution. The policy management system includes three principle components or functions: First, a User Matrix 44 for selecting and authorizing recipients of particular digital content based on predetermined criteria such as one or more of a recipient's identity, grade, level, agency and location.

Second, the policy management system 42 can also maintain a content matrix 48 for selecting and authorizing distribution of content based on predetermined criteria. For example, such criteria can be one or more of a DRM rule, content priority, user priority, and an alert status of the emergency information management system. And third, the policy management system 42 can also include an acquisition module 46 for content selection and packaging. This can include protocol implementations for inter-agency communications.

The policy management system forwards selected and properly packaged content to the "mechanical" module 50 for quality control, encoding, metadata additions if appropriate, and other preparation depending on the receiver device type, channels, etc. Note that all of this is behind a security/authorization "firewall" 52 so that all content creation and distribution management is secure. "Hacking" into an emergency information management system of this type by enemies or mere pranksters could have disastrous consequences. In this light, security is paramount, and the use of effective authentication schemes is encouraged, including voice recognition, other biometrics, FOB's or ID tokens, "dongle" or other hardware ID techniques, etc. The remaining modules 54, 56, 58 in FIG. 3 have adequate explanatory labels in the drawing.

Summary of Emergency Operation

In the event of an emergency, a small control file is sent via any available transport to the various client devices, as noted above, triggering the appropriate alert and requiring a user response. The locally cached data that is necessary to the authorized user in this type of event is either accessed directly from the secure cache or, in the event it is not stored, is delivered and the local logging and reporting function returns a small log file to the reporting and logging module reporting that the alert has been received, which content has been viewed, when and by whom.

The present system for Emergency Information Management is unique in its ability to make secure, Rich Media-based information services available in times of limited or severely disrupted communications ensuring that the right information reaches the right personnel at the right time. Put another way, the present invention includes a secure audio/video/text communications channel, or links to such channels, over the Internet, designed to provide targeted information to key responders and managers, on a need-to-know basis, during an emergency.

The present invention is useful in connection with the following functions:

Immediately link both governmental and authorized non-governmental responders, in near real-time, with command-and-control decision centers;

Transmit information securely, limiting the information to those with a certified need to know;

Override ordinary computer operations in order to deliver a rich-media emergency message to thousands of certified officials, at once;

Allow for multiple points of authorized-content entry—while also reaching many users who would be prohibited from inputting information;

Connect to a variety a wireless devices, providing a means of communicating securely, in a coordinated fashion, with responders at the scene of an incident;

Deliver video, audio, rich graphics, text and Web applications (forms, reporting, etc.) via a single system.

The invention leverages a combination of secure content delivery technologies that are in wide use today on the Internet (and likely will employ others not yet known). By combining elements of digital rights management (DRM), rich media streaming and downloading, secure caching, digital certificate authentication (and certificate authority systems), and various neural net rules engines—all linked to common local applications such as Windows Media Player and Adobe Reader—the present invention enables a new secure communications channel, with surprisingly low operational or technical overhead.

In an illustrative implementation, the present invention provides a secure PC-based webcasting type of network that delivers to each of its certified users a special client "Receiver." This receiver 20 is small application built with such components as common media players and related DRM tools, and utilizes advanced "secure access" technology (e.g., digital certificate-based ID authentication).

The receiver software client can easily be downloaded, in advance, by all certified users. The receiver then checks in regularly and automatically with a set of "home" servers, whenever the user is online. Content files—audio, video or text/graphics, as well as "rules" and system instructions that are opaque to the user—are then "pulled" down to the local PC, according to dynamic protocols set at a command center. The system can (and should, to breed user familiarity) be used to provide security updates, instruction and overall coordination in non-crisis situations. But its main purpose is to provide secure communications in a coordinated manner during a crisis.

One unique feature of the receiver client is its extensive use of secure caching technology. By building a secure cache into every receiver, the information management system is able to deliver and securely store all files that are passed to the local PC. A low-level user does not have access to the cache contents directly: He or she can view them only through the use of the client application. Higher level users can be given rights to capture the files, if necessary. Furthermore, many rich media files can be stored locally on the user's PC, ready to be played instantly in the case of an emergency.

Thus, standard emergency procedure instructions—say, for the evacuation of a city—can be programmed centrally, and played locally upon command from the center of operations. The playback (delivery) of these files is controlled by this command center, via settings that are communicated to a local rules engine that resides in each user's receiver. The settings are transmitted in a relatively small "control file". The control file need not come from the same server as originated the content (although the two functions should be coordinated).

In times of emergency, this local engine drives the system's Override function, in effect "turning on" the emergency receiver, and automatically suppressing non-emergency uses of the receiving machine. This Override might be, for example, a full-screen video display, instantly taking over the user's screen.

Figure 4:
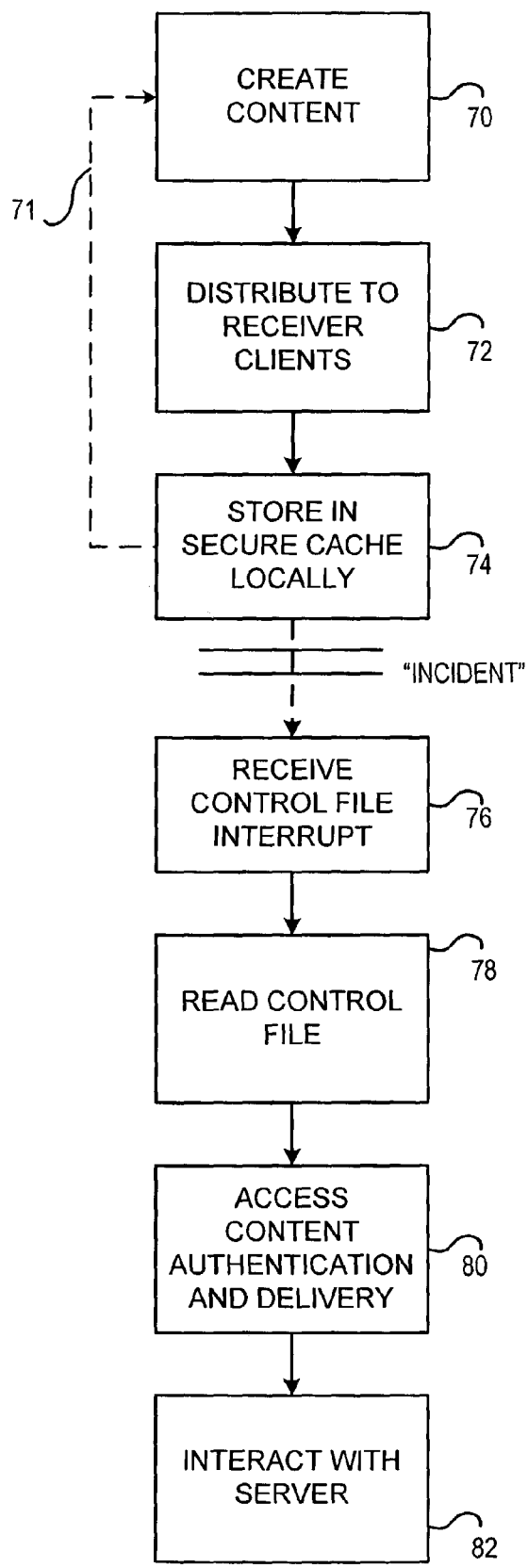
FIG. 4 is a simplified flow diagram illustrating generally a method of emergency information management in accordance with one embodiment of the invention.

FIG. 4 provides a flow diagram of a method of information management in accordance with the present invention. FIG. 4 illustrates the steps of creating content 70; distributing the content to receiver clients 72; and storing the content in a secure local cache. It may be updated periodically as described. Subsequently, if and when an incident occurs (or an incident is imminent, or recently occurred), a message or control file is sent to the receiver client 76, which immediately interrupts other activity on the client device if necessary. The client software reads the control file 78, and based on indicia therein, which preferably are encoded, the client accesses the content previously stored in the secure cache, step 80. This accessing step includes decryption other steps necessary to delivery of the content in a form meaningful to the human user. Authentication of the user is part of the delivery process. Finally, as mentioned above, the receiver client sends a feedback message to the server logging/analysis module confirming the transaction. Another part of the feedback loop includes the user's ability to access response forms and incident reports within the receiver client and to send that information as part of the feedback loop. These reports can include detailed information about specific incidents, as well as digital attachments such as images or audio files.

While a PC-only system to start, advanced versions of the described system will also link to wireless devices via highly secure CDMA communications. Also, over time, the system could evolve from its initial media delivery interface and functionality (mirroring TV, radio and newspapers) into a digital dashboard that would include an increasing number of real-time monitoring, statistical delivery and command-and-control functions.

Also, because of preferred "phone home," or pull, architecture, rich reporting capabilities not only provide additional security, but also an immediate feedback mechanism to determine just who is online getting access to the emergency information, and who is not. It also leaves a tamper-proof record of precisely what information was sent to whom, by whom, and when, for incident analysis after a crisis has subsided as well as the full auditing functions of how that content was used by the users The present system's biggest short-term advantage for homeland security is the fact that it is extremely light on the user end. No special training is required; in fact, it is literally plug-and-play. All security—except for the user authentication during log-on—happens in background, with no user requirements.

The central hubs of the contemplated system do require a considerable investment in network operations. Also, except in the case of text files, emergency message production and "content prep" require considerable investment in systems and training. When routine video production (or video conferencing) capabilities are in place, the only additional system requirements at the command/control points are a streamlined, highly-automated, content prep process (encoding, encrypting) and a professional online network operations competency.

Yet these investments of time, money, training and continuing system overhead are minuscule compared to a stand-alone system using radio, television broadcast in a proprietary communications system. While the present system is not designed to replace the most secure and private communications, it can instantly and effectively increase the communication and coordination among those who have a need for vital information during an emergency.

It will be obvious to those having skill in the art that many changes may be made to the details of the above-described embodiments without departing from the underlying principles of the invention. The scope of the present invention should, therefore, be determined only by the following claims.

The invention claimed is:

1. A wide-area emergency information management system for targeted distribution of information content to authorized recipients, to support response to an incident reported to the management system, comprising:
   a security authentication module that encrypts information content as encrypted digital content;
   a server, arranged to receive an incident report and to determine from the incident report a type of the incident and a geographic location of the incident;
   a policy management system coupled to the server for managing information content distribution, wherein the policy management system applies business rules to select information content for distribution based on incident types, recipients' roles, and geo-spatial proximity of each recipient to the determined geographic incident location;

a broadcast module that securely pre-positions said encrypted digital content on a plurality of remote recipient devices prior to receiving an incident report and that transmits an incident control file in response to the received incident report to a selected group of recipients as determined by the type of incident and the geographic location of the incident; and a receiver application program stored on each of the recipient devices, each receiver application program programmed to:

communicate with the broadcast module to receive the encrypted digital content and the subsequent incident control file, securely cache the digital content received from the broadcast module prior to receiving an incident report, and in response to receipt of the incident control file, decrypt at least selected portions of the previously cached digital content, alert an authenticated user of the receiver application, and enable access to at least a selected portion of the pre-positioned digital content based on the incident type and a role of the authenticated user;

wherein the cached digital content remains inaccessible to a user of the recipient device until the incident control file is received at the recipient device.

2. A wide-area emergency information management system according to claim 1 wherein the policy management system maintains a user matrix for selecting and authorizing recipients of particular digital content based on predetermined criteria comprising one or more of a recipient's identity, grade, level, agency and location.

3. A wide-area emergency information management system according to claim 1 wherein the policy management system maintains a content matrix for selecting and authorizing distribution of content based on criteria comprising one or more of a DRM rule, content priority, user priority, and an alert status of the emergency information management system.

4. A wide-area emergency information management system according to claim 1, including a content authoring module for preparation of digital content for delivery in response to a predetermined class of incident to selected recipients; and wherein the policy management system includes a content acquisition system coupled to the content authoring module for selection and content packaging.

5. A wide-area emergency information management system according to claim 1 wherein the receiver application decrypts and delivers the cached digital content to the authenticated user in response to receipt of the incident control file.

6. A wide-area emergency information management system according to claim 5 wherein the incident control file identifies specific digital content files to be decrypted and delivered to the user.

7. A wide-area emergency information management system according to claim 6 and further comprising a logging facility for maintaining records related to accessing of the digital content; and wherein the receiver application reports to the logging facility an indicia that indicates the identity of the authenticated user and the pre-positioned digital content or selected portion thereof accessed by the user.

8. A wide-area emergency information management system according to claim 7 wherein the indicia includes a date/time stamp indicating when the the digital content was accessed by the user.

9. A wide-area emergency information management system according to claim 7 wherein the indicia includes a location stamp indicating the location of the user when the user accesses the pre-positioned digital content.

10. A wide-area emergency information management system according to claim 1 wherein the receiver application further includes means for updating the cache of digital content as new or updated content becomes available to it from the broadcast module.

11. A method of emergency information management to ensure distribution of information to entities having a need to know the information in the event of an incident, the method comprising the steps of:

providing a server;

at the server, receiving reports of incidents, and in response to a received incident report:

determining a type of the incident, and determining a geographic location of the incident;

prior to the occurrence of an incident, creating digital content;

prior to the occurrence of an incident, pre-positioning the digital content by distributing the digital content in advance of an incident to multiple digital devices, each digital device associated with an entity that may desire access to the digital content in the event of an incident;

prior to the occurrence of an incident, storing the distributed digital content locally in a secure cache in each of the digital devices;

in response to an incident, transmitting a control file to at least one of the digital devices;

wherein said transmitting a control file includes determining targeted entities to which the control file should be sent, based on a predetermined geographical location of the entity, the geographical location of the incident, and a geographic proximity of the entity to the incident location;

in the at least one digital device, responsive to receiving the control file:

authenticating the control file;

authenticating the current user of the digital device; and in response to authentication of the control file, alerting the authenticated user to the occurrence of the incident and, responsive to indicia contained in the control file, enabling the user to access specific previously-stored digital content appropriate to the type of incident; and wherein the digital content in the secure cache remains inaccessible to users of the digital devices until the control file is received and authenticated.

12. A method of emergency information management according to claim 11 wherein the control file specifies portions of the digital content to be enabled for access.

13. A method of emergency information management according to claim 11 wherein the control file identifies a specific individual user who is thereby authorized to receive the digital content.

14. A method of emergency information management according to claim 11 and further comprising transmitting from the digital device to a central emergency management authority an indication that the control file was received.

15. A method of emergency information management according to claim 14 wherein the indication that the control file was received includes a date and time stamp.

16. A method of emergency information management according to claim 11 and further comprising transmitting from the digital device to a central emergency management authority an indication of the cached digital content or portion thereof that was accessed by the user.

17. A method of emergency information management according to claim 16 wherein the indication that the cached digital content was accessed includes a date and time stamp.

18. A method of emergency information management according to claim 16 wherein the indication that the cached digital content was accessed includes identification of the user who accessed the digital content.

19. A method of emergency information management according to claim 11 wherein the control file includes a key for decrypting the specific digital content identified for access.

20. A method of emergency information management to ensure distribution of information to entities who may have a need to know the information in the event of an incident, the method comprising the steps of:
providing a server;
at the server, receiving reports of incidents, and in response to a received incident report:
determining a type of the incident, and
determining a geographic location of the incident;
creating digital content;
pre-positioning the digital content by distributing the digital content in advance of an incident to at least one remote receiver device that is associated with one of the entities who may have a need to know the digital content in the event of an incident;
storing the distributed digital content locally in the receiver device;
in response to an incident, transmitting a control file to the receiver device where the digital content was pre-positioned;
in the receiver device, in response to receiving the control file:
authenticating that the control file is intended for the receiver device,
authenticating that a current user of the digital device is authorized to receive an
alert as indicated in the control file, based at least on a role of the current user, and
in response to authentication of the control file and the current user, alerting the user to the occurrence of the incident and, responsive to indicia contained in the control file, directing the current user to access at least one specific file of the pre-positioned digital content to receive information that is appropriate to the incident; and
wherein the digital content stored in the receiver device remains inaccessible to users of the receiver device until the control file is received and authenticated by the receiver device.

21. A method of emergency information management according to claim 20 wherein each entity has a predetermined geographic location parameter; and
said transmitting a control file step includes transmitting the control file only to receiver devices that are associated with entities that have a predetermined geographical location that lies within a selected proximity to the incident.

22. A method of emergency information management according to claim 20 wherein:
each entity has a predetermined emergency role, location and organization; and
said transmitting a control file step includes transmitting the control file only to receiver devices that are associated with entities determined to be appropriate to receive the control file based on one or more of the entity's emergency role, location, and organization.

23. A method of emergency information management according to claim 20 wherein:
each entity has one or more authorized users, each user having a predetermined authorization level; and
said transmitting a control file step includes transmitting the control file only to receiver devices that are associated with users determined to be appropriate to receive the control file based on the user's authorization level.

24. A method according to claim 23 and further comprising transmitting a message from the receiver device to the server acknowledging receipt of the control file.

25. A method according to claim 24 wherein the message includes an indication of the pre-positioned content files accessed by the user in response to the alert.

26. A method according to claim 24 wherein the message includes a date and time stamp.

27. A method according to claim 24 wherein the message includes an observation of local conditions input by the user to provide information back to the server.

28. A method according to claim 24 and further comprising:
at the server, logging results of the broadcast of control files for a given incident based on messages received from receiver devices that received control files in response to the incident.

* * * * *